(12) United States Patent
Schanke et al.

(10) Patent No.: US 7,583,600 B1
(45) Date of Patent: Sep. 1, 2009

(54) SCHEDULE PREDICTION FOR DATA LINK LAYER PACKETS

(75) Inventors: Morten Schanke, Oslo (NO); Magne Vidulf Sandven, Ski (NO); Finn Egil Grimnes, Oslo (NO)

(73) Assignee: Sun Microsytems, Inc., Santa Clara, CA (US)

( * ) Notice: Subject to any disclaimer, the term of this patent is extended or adjusted under 35 U.S.C. 154(b) by 610 days.

(21) Appl. No.: 11/221,535

(22) Filed: Sep. 7, 2005

(51) Int. Cl.
*G01R 31/08* (2006.01)

(52) U.S. Cl. ..................................... 370/235

(58) Field of Classification Search ................ 370/230, 370/235, 229, 504, 230.1, 241, 254, 505, 370/528; 710/313, 314, 315, 1, 8, 62
See application file for complete search history.

(56) References Cited

U.S. PATENT DOCUMENTS

| | | | |
|---|---|---|---|
| 5,272,700 A * | 12/1993 | Hansen et al. | 370/480 |
| 5,355,366 A * | 10/1994 | Li et al. | 370/528 |
| 6,163,824 A * | 12/2000 | Quackenbush et al. | 710/100 |
| 6,199,123 B1 * | 3/2001 | Simonich et al. | 710/36 |
| 6,215,769 B1 * | 4/2001 | Ghani et al. | 370/230 |
| 6,748,445 B1 * | 6/2004 | Darcy et al. | 709/237 |
| 2006/0114918 A1* | 6/2006 | Ikeda et al. | 370/408 |

* cited by examiner

*Primary Examiner*—Kwang B Yao
*Assistant Examiner*—Anh Ngoc Nguyen
(74) *Attorney, Agent, or Firm*—Park, Vaughan & Fleming LLP

(57) ABSTRACT

There can be provided a port operable for a PCI Express link. The port can comprise a scheduler operable to determine a next management packet transmission time, and a windower operable to determine a transmission window based upon the next management packet transmission time. The port can also comprise an inserter operable to examine a data packet stream to determine whether a gap therein occurs during the transmission window, and if such a gap does occur to control insertion of a management packet thereinto. Thus transmission efficiency for management packets over the link can be increased.

24 Claims, 7 Drawing Sheets

SCHEDULE PREDICTION FOR DATA LINK LAYER PACKETS

FIELD

The present invention relates to schedule prediction and in particular, but not exclusively, to schedule prediction for data link layer packets in PCI Express.

BACKGROUND

In many computer environments, a fast and flexible interconnect system can be desirable to provide connectivity to devices capable of high levels of data throughput. In the fields of data transfer between devices in a computing environment PCI Express (Peripheral Component Interconnect-Express) can be used to provide connectivity between a host and one or more client devices or endpoints. PCI Express is becoming a de-facto I/O interconnect for servers and desktop computers. PCI Express allows physical system decoupling (CPU<->I/O) through high-speed serial I/O. The PCI Express Base Specification 1.0 sets out behavior requirements of devices using the PCI Express interconnect standard. This includes a set of criteria for transfer of data link layer packets.

SUMMARY OF THE INVENTION

The present invention has been made, at least in part, in consideration of problems and drawbacks of conventional systems.

Viewed from one aspect, the present invention provides a system for scheduling of transmission of data link layer packets based on prediction and forward looking to optimize packet flow and available bandwidth. Thereby higher utilization can be obtained in a PCI Express system.

Viewed from another aspect, there is provided a port operable for a PCI Express link. The port can comprise a scheduler operable to determine a next management packet transmission time, and a windower operable to determine a transmission window based upon the next management packet transmission time. The port can also comprise an inserter operable to examine a data packet stream to determine whether a gap therein occurs during the transmission window, and if such a gap does occur to control insertion of a management packet thereinto. Thus, transmission efficiency for management packets over the link can be increased.

Viewed from a further aspect, there is provided a method for controlling insertion of link management packets into a data packet stream for a PCI Express port. The method can comprise determining a next management packet transmission time, and determining a transmission window based upon the determined next management packet transmission time. The method can also comprise examining a data packet stream for gaps therein during the determined transmission window, and inserting a management packet into such a gap, if a gap is identified. Thereby a increased link utilisation efficiency can be achieved.

Particular and preferred aspects and embodiments of the invention are set out in the appended independent and dependent claims.

BRIEF DESCRIPTION OF THE FIGURES

Specific embodiments of the present invention will now be described by way of example only with reference to the accompanying figures in which.

Figure 1:
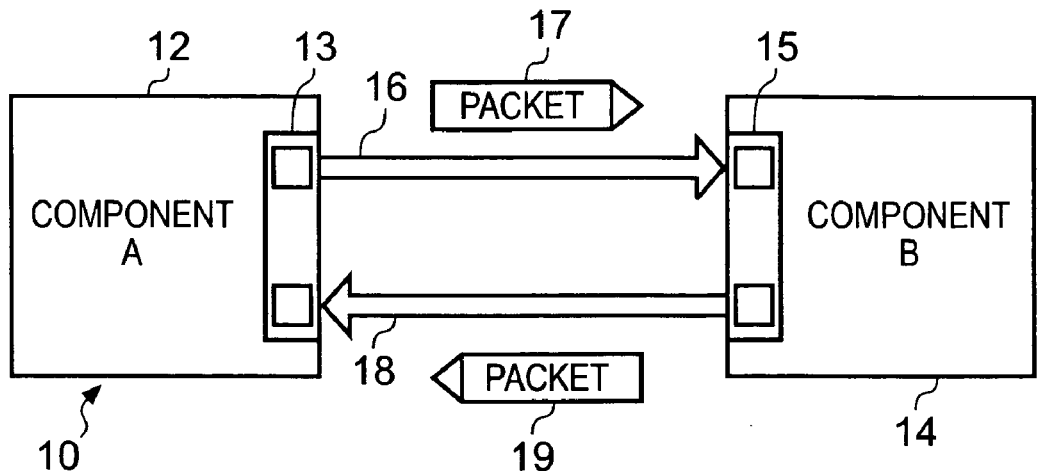
FIG. 1 shows a schematic representation of a PCI-Express connection.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF PARTICULAR EMBODIMENTS

One computer interconnect standard is the PCI-Express 1.0 standard set out in the PCI-Express Base Specification 1.0 available from the PCI (Peripheral Component Interconnect) Special Interest Group (www.pcisig.com). The PCI-Express architecture is a high performance, general purpose I/O interconnect defined for a wide variety of existing and future computing and communication platforms. Key attributes from the original PCI architecture, such as its usage model, load-store architecture, and software interfaces, are maintained. On the other hand, the parallel bus implementation of PCI is replaced in PCI-Express by a highly scalable, fully serial interface. Among the advanced features supported by PCI-Express are Power Management, Quality of Service (QoS), Hot-Plug/Hot-Swap support, Data Integrity, and Error Handling. PCI-Express is also backwards compatible with the software models used to describe PCI, such that PCI-Express hardware can be detected and configured using PCI system configuration software implementations with no modifications.

With reference to FIG. 1, there will now be described the basic point-to-point communications channel provided by PCI-Express. A component collection consisting of two ports and the lanes connecting those ports can be referred to as a link. A link represents a dual-simplex communications channel between two components. As shown in FIG. 1, in its simplest form, a link 10 includes two components 12 and 14, each including a respective transmit and receive port pair 13 and 15. Two uni-directional, low-voltage, differentially driven channels 16 and 18 connect the ports of the components, one channel in each direction. The channel pair can be referred to as a lane. The channels 16 and 18 each carry packets 17 and 19 between the components. According to the PCI-Express 1.0 specification, each lane provides an effective data transfer rate of 2.5 Gigabits/second/lane/direction. For circumstances where this data bandwidth is insufficient, to scale bandwidth, a link may aggregate multiple Lanes denoted by xN where N may be any of the supported Link widths. An x8 Link represents an aggregate bandwidth of 20 Gigabits/second of raw bandwidth in each direction. This base specification 1.0 describes operations for x1, x2, x4, x8, ×12, ×16, and ×32 Lane widths. According to the specification only symmetrical links are permitted, such that a link includes the same number of lanes in each direction.

Figure 2:
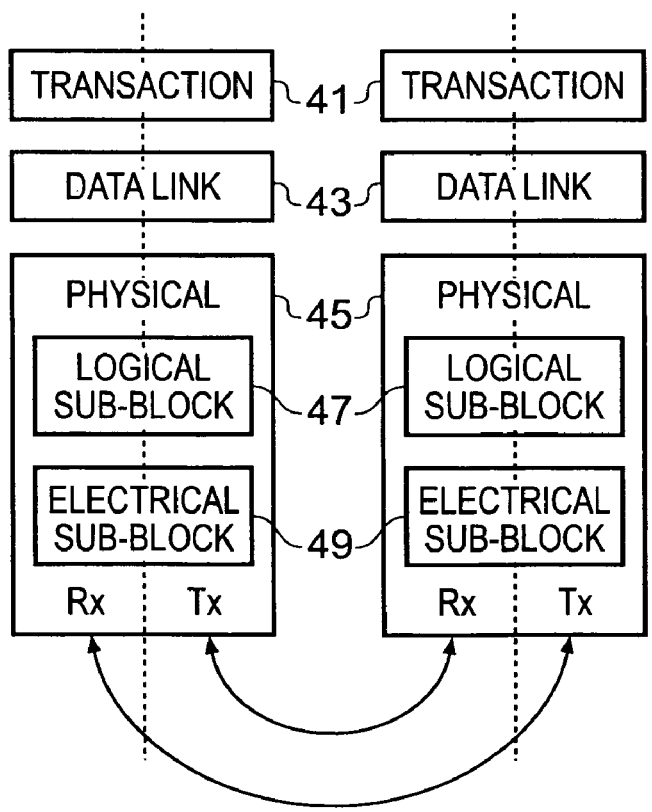
FIG. 2 shows a schematic overview of layering within PCI-Express.

A schematic overview of the PCI-Express architecture in layers is shown in FIG. 2. As shown, there are three discrete logical layers: the Transaction Layer 41, the Data Link Layer 43, and the Physical Layer 45. Each of these layers is divided into two sections: one that processes outbound (to be transmitted) information and one that processes inbound (received) information.

PCI-Express uses packets to communicate information between components. Packets are formed in the Transaction and Data Link Layers to carry the information from the transmitting component to the receiving component. As the transmitted packets flow through the other layers, they are extended with additional information necessary to handle packets at those layers. At the receiving side the reverse process occurs and packets get transformed from their Physical Layer representation to the Data Link Layer representation and finally (for Transaction Layer Packets) to the form that can be processed by the Transaction Layer of the receiving device.

Figure 3:
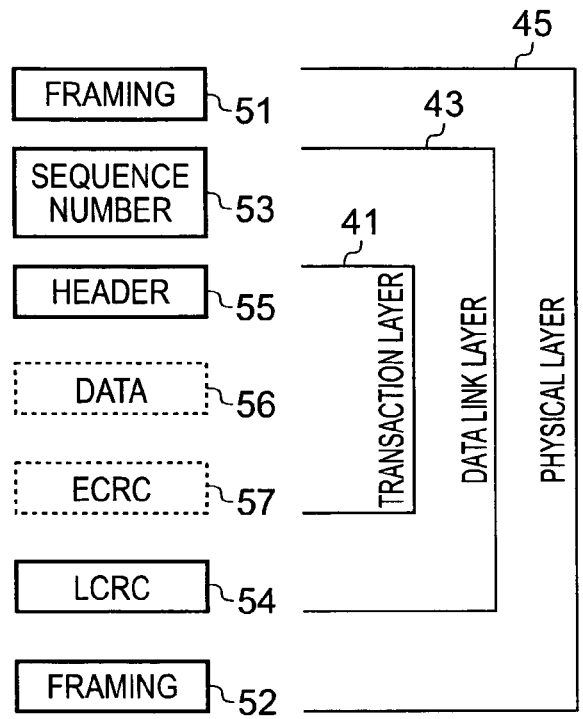
FIG. 3 shows a schematic representation of packet flow through the layers shown in FIG. 2.

A conceptual overview of the flow of transaction level packet information through the layers is shown in FIG. 3. Thus the Transaction Layer 41 provides a packet header 55, and can provide a data payload 56 and an ECRC (End-to-end Cyclic Redundancy Check) 57. The data link layer applies a sequence number 53 and a LCRC (Link Cyclic Redundancy Check) 54. The Physical Layer 45 then provides Framing 51, 52 for the packet. A simpler form of packet communication is supported between two Data Link Layers (connected to the same Link) for the purpose of Link management.

The upper Layer of the architecture is the Transaction Layer 41. The Transaction Layer's primary responsibility is the assembly and disassembly of Transaction Layer Packets (TLPs). TLPs are used to communicate transactions, such as read and write, as well as certain types of events. The Transaction Layer is also responsible for managing credit-based flow control for TLPs.

Every request packet requiring a response packet is implemented as a split transaction. Each packet has a unique identifier that enables response packets to be directed to the correct originator. The packet format supports different forms of addressing depending on the type of the transaction (Memory, I/O, Configuration, and Message). The Packets may also have attributes such as No Snoop and Relaxed Ordering.

The transaction Layer supports four address spaces: it includes the three PCI address spaces (memory, I/O, and configuration) and adds a Message Space. According to the PCI-Express specification, the Message Space is used to support all prior sideband signals, such as interrupts, power-management requests, and so on, as in-band Message transactions. PCI-Express Message transactions can be considered as "virtual wires" since their effect is to eliminate the wide array of sideband signals used in a conventional platform implementation.

The middle Layer in the stack, the Data Link Layer 43, serves as an intermediate stage between the Transaction Layer 41 and the Physical Layer 45. The primary responsibilities of the Data Link Layer 41 include Link management and data integrity, including error detection and error correction.

The transmission side of the Data Link Layer 43 accepts TLPs assembled by the Transaction Layer 41, calculates and applies a data protection code and TLP sequence number, and submits them to Physical Layer 45 for transmission across the Link. The receiving Data Link Layer 43 is responsible for checking the integrity of received TLPs and for submitting them to the Transaction Layer 41 for further processing. On detection of TLP error(s), this Layer is responsible for requesting retransmission of TLPs until information is correctly received, or the Link is determined to have failed.

The Data Link Layer 43 also generates and consumes packets that are used for Link management functions. To differentiate these packets from those used by the Transaction Layer (TLP), the term Data Link Layer Packet (DLLP) is used when referring to packets that are generated and consumed at the Data Link Layer.

The Physical Layer 45 includes all circuitry (electrical sub-block 49) for interface operation, including driver and input buffers, parallel-to-serial and serial-to-parallel conversion, PLL(s) (Phase-locked-loops), and impedance matching circuitry. It includes also logical functions (logic sub-block 47) related to interface initialization and maintenance. The Physical Layer 45 exchanges information with the Data Link Layer 43 in an implementation-specific format. This Layer is responsible for converting information received from the Data Link Layer 43 into an appropriate serialized format and transmitting it across the PCI-Express Link at a frequency and width compatible with the device connected to the other side of the Link.

The PCI-Express architecture has various facilities to support future performance enhancements via speed upgrades and advanced encoding techniques. Depending on actual implementation of these enhancements, the future speeds, encoding techniques or media may only impact the Physical Layer definition.

The Transaction Layer 41, in the process of generating and receiving TLPs, exchanges Flow Control information with its complementary Transaction Layer 41 on the other side of the Link. It is also responsible for supporting both software and hardware-initiated power management.

Initialization and configuration functions require the Transaction Layer 41 to store Link configuration information generated by the processor or management device and store Link capabilities generated by Physical Layer hardware negotiation of width and operational frequency A Transaction Layer's Packet generation and processing services require it to: generate TLPs from device core Requests; convert received Request TLPs into Requests for the device core; convert received Completion Packets into a payload, or status information, deliverable to the core; detect unsupported TLPs and invoke appropriate mechanisms for handling them; and if end-to-end data integrity is supported, generate the end-to-end data integrity CRC and update the TLP header accordingly.

Within flow control, the Transaction Layer 41 tracks flow control credits for TLPs across the Link. Transaction credit status is periodically transmitted to the remote Transaction Layer using transport services of the Data Link Layer. Remote Flow Control information is used to throttle TLP transmission.

The transaction layer 41 can also implement ordering rules including the PCI/PCI-X compliant producer consumer ordering model and extensions to support relaxed ordering.

Power management services within the transaction layer 41 may include: ACPI/PCI power management, as dictated by system software; and hardware-controlled autonomous power management minimizes power during full-on power states.

The transaction layer 41 can also implement handling of Virtual Channels and Traffic Class. The combination of Virtual Channel mechanism and Traffic Class identification is provided to support differentiated services and QoS (Quality of Service) support for certain classes of applications. Virtual Channels provide means to support multiple independent logical data flows over given common physical resources of the Link. Conceptually this involves multiplexing different data flows onto a single physical Link. The Traffic Class is a Transaction Layer Packet label that is transmitted unmodified end-to-end through the fabric. At every service point (e.g., Switch) within the fabric, Traffic Class labels are used to apply appropriate servicing policies. Each Traffic Class label defines a unique ordering domain—no ordering guarantees are provided for packets that contain different Traffic Class labels.

The Data Link Layer 43 is responsible for reliably exchanging information with its counterpart on the opposite side of the Link. Accordingly, it has responsibility for initialization and power management services to: accept power state requests from the Transaction Layer 41 and convey them to the Physical Layer 45; and to convey active/reset/disconnected/power managed state information to the Transaction Layer 41.

The data link layer 43 also provides data protection, error checking, and retry services including: CRC generation; transmitted TLP storage for data link level retry; error checking; TLP acknowledgment and retry messages; and error indication for error reporting and logging.

The Physical Layer 45 provides services relating to interface initialization, maintenance control, and status tracking, including: Reset/Hot-Plug control/status; Interconnect power management; width and lane mapping negotiation; and polarity reversal. The physical layer 45 can also provide services relating to symbol and special ordered set generation including: 8-bit/10-bit encoding/decoding; and embedded clock tuning and alignment.

Within symbol transmission and alignment, the physical layer 45 can provide services including: transmission circuits; reception circuits; elastic buffer at receiving side; and multi-lane de-skew (for widths >×1) at receiving side. The physical layer 45 may also provide system DFT (Design For Test) support features.

The inter-layer interfaces support the passing of packets and management information. The transaction/data link interface provides: byte or multi-byte data to be sent across the link (including a local TLP-transfer handshake mechanism, and TLP boundary information); and requested power state for the link. The data link to transaction interface provides: byte or multi-byte data received from the PCI-Express link; TLP framing information for the received byte; actual power state for the Link; and Link status information.

The data link to physical interface provides: byte or multi-byte wide data to be sent across the link (including a data transfer handshake mechanism, and TLP and DLLP boundary information for bytes); and requested power state for the Link. The physical to data link interface provides: byte or multi-byte wide data received from the PCI Express link; TLP and DLLP framing information for data; indication of errors detected by the physical layer; actual power state for the link; and connection status information.

Thus there has now been described an overview of the basic principles of the PCI-Express interface architecture. Further information regarding the architecture can be obtained from the PCI Special Interest Group and from a variety of texts describing the architecture, such as "Introduction to PCI Express: A Hardware and Software Developer's Guide" ISBN: 0970284691, and "PCI Express System Architecture" ISBN: 0321156307.

As described above, PCI-Express provides a high performance, general purpose interconnect for use in a variety of computing and communication platforms. It offers a usage model similar to that provided by the widely used bus-based PCI (Peripheral Component Interconnect) standard, but replaces the parallel bus of PCI with higher performance point-to-point (serial) interconnects. Where it is desired to connect multiple devices to a single PCI-Express host (or "root complex") switches can be used, and are defined in the PCI-Express base specification for this purpose.

To provide for components requiring varying bandwidths, individual (1×, 2.5 Gbps) PCI Express lanes can be stacked or bundled in any number from two (2×) to thirty-two (32×). Such bundled lanes can therefore provide respective multiples of maximum bandwidth to a connected device. For example, an 8× link provides a maximum aggregated raw bandwidth of 20 Gbps in each direction. Such bundled links typically contain a multiple-of-two number of single links (i.e. 2×, 4×, 8×, 12×, 16×, or 32×).

As described above, for transmission of data over a link, the transaction layer is responsible for the transport of data over a PCI-Express link, and the data link layer is responsible for management of the PCI-Express link. The two principal information types carried by Data Link Layer Packets (DLLPs) are acknowledgement information for Transaction Layer Packets (TLPs) and link flow control. Acknowledgement DLLPs are used by a receiver to report back on the success of a particular data transfer to the transmitter, and flow control DLLPs are used to announce available buffer space (or "credit") at the receiver to the transmitter. DLLPs have a predefined packet size of 2 data words (64 bits).

Figure 4:
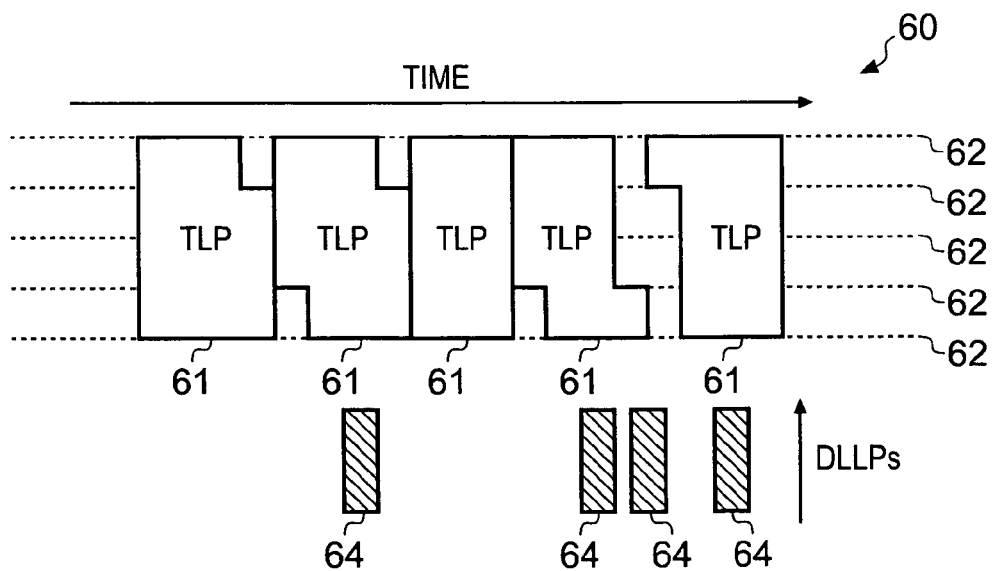
FIG. 4 shows a schematic representation of transaction layer packets in a transmit sequence.

Within a multi-link system (i.e. any number of bundled links from 2× to 32×) TLPs can start and end on any 32 bit data word boundary. The PCI-Express Standard defines that TLPs are always 32 bit aligned regardless of the link width. Thus for 1×, 2× and 4×, the TLP start will always be on lane 0; for 8×, lane 0 or 4; for 12×, lane 0, 4 or 8; and so on for 16× and 32×. This can create a challenge for scheduling packets for maximum transmit efficiency, especially for switches, where sequential TLPs are highly likely to start and end on non-matching boundaries (due to the TLPs having different source and/or destination devices). In addition, DLLPs will be scheduled at arbitrary intervals (as necessary to perform the flow control and acknowledgement functions). FIG. 4 shows an example of a stream 60 of TLPs 61 in a 4× link which have start and end points at different ones of the possible 32 bit data word boundaries 62. Into the stream of TLPs 60, it is required to insert various DLLPs 64.

Figure 5:
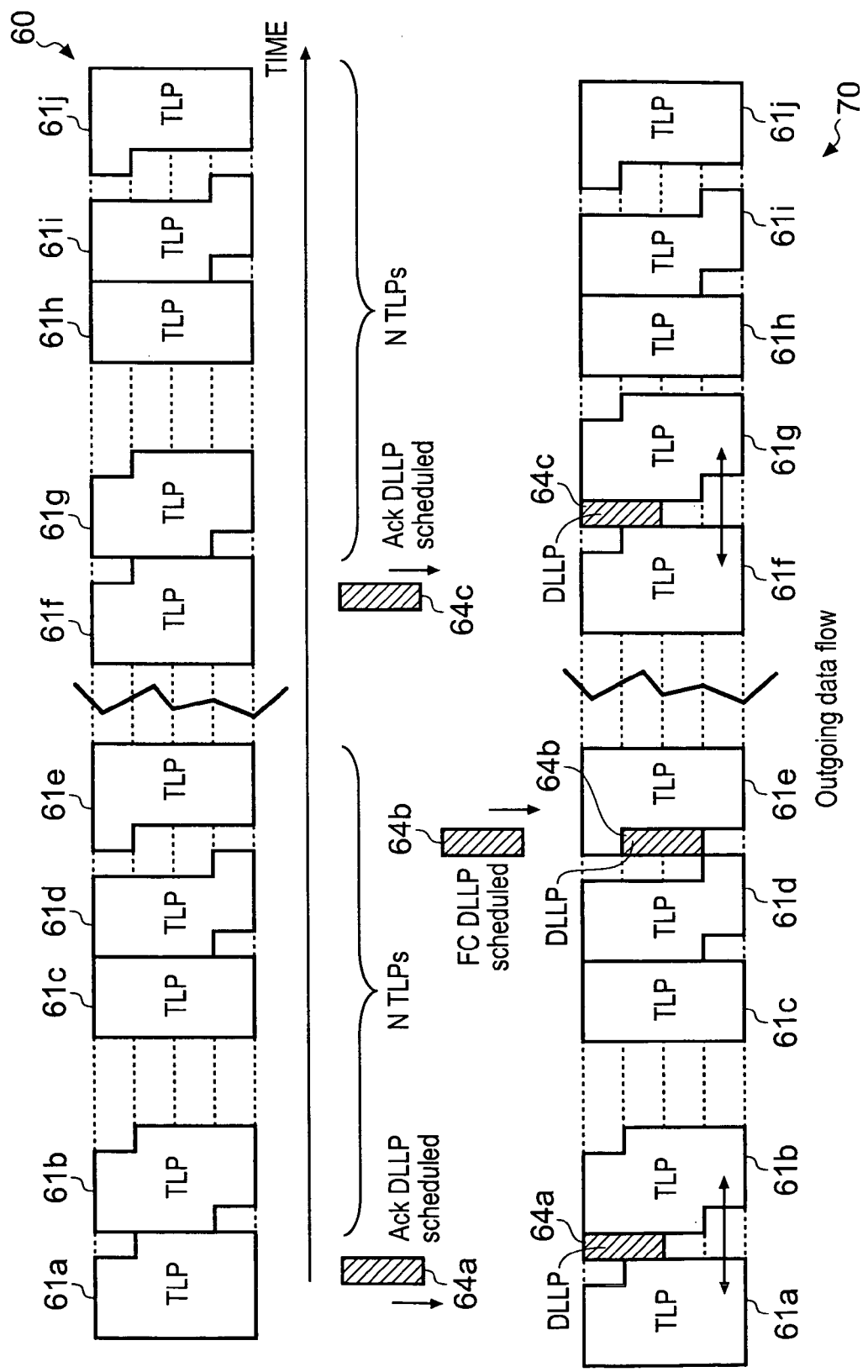
FIG. 5 shows a schematic representation of insertion of data link layer packets into the transmit sequence of FIG. 4.

An example of a conventional method for insertion of DLLPs into a TLP stream is shown in FIG. 5. As shown, a plurality of TLPs 61*a*-*j* are in a transmit stream 60 and have non-aligned start and end positions corresponding to various ones of the 32 bit data word boundaries 62. Also shown are acknowledgement DLLPs 64*a* and 64*b*, and flow control DLLP 64*c*, each of which needs insertion into the TLP stream 60.

Acknowledgement DLLPs are scheduled based upon a calculation defined in the PCI-Express base specification, which sets a so-called "Ack factor" based upon the link width and maximum transmission unit (MTU) size (which defines the maximum allowable TLP size). Also, the Ack interval is set dependent upon the size and number of received TLPs and time. For small TLP sizes, the Ack interval can be as large as 80-100 symbol times, one symbol time being the time taken to transmit one symbol (one data byte) on a 1× link. Flow control DLLPs are scheduled based upon a need to release receive credit and a timer (the maximum packet spacing for Flow Control DLLPs is 17 µs), in contrast to Acknowledgement DLLPs which are sent only in response to received TLPs. Ack and Nack DLLPs are transmitted with higher priority than Flow Control DLLPs.

In the example shown in FIG. 5, the various DLLPs 64 are scheduled for insertion at the time positions shown. Thus, in accordance with the DLLP handling routine specified in the PCI-Express base specification, the DLLPs have priority over the TLPs. The DLLPs 64 are therefore inserted into the steam 60 following the end of any TLP 61 which is in progress at the schedule time of the DLLP 64.

In the example shown in FIG. 5, Acknowledgement DLLP 64*a* therefore forces a new gap in the TLP stream to allow that DLLP to be transmitted following the end of the TLP which is ongoing at the scheduled transmission time of that DLLP. Thus a gap is opened between TLPs 61a and 61b.

Taking Flow Control DLLP 64b, in the present example there is sufficient space between the end of TLPs 61d and 61e for this DLLP to be inserted into the stream 60 without forcing open a new space.

Finally, for Acknowledgement DLLP 64c, again there is insufficient space between the relevant TLPs (TLPs 61f and 61g) for the DLLP 64c to be inserted at the end of TLP 61f. As a result, a gap is forced between those two TLPs.

Thus it can be seen that inefficiencies in the outgoing data flow 70 are created to allow DLLPs to be inserted at their scheduled transmission times.

In order to address this problem of inefficiencies being created to meet the scheduling requirements for DLLPs, it is possible to shift and rotate TLPs in the packet stream into the outgoing data flow, and to rotate DLLPs into the outgoing data flow to ensure that DLLPs can be fitted in with minimum time inefficiency in the outgoing data flow. In the most optimized possible implementation of such a system, up to 100% utilization of the available bandwidth can be achieved. To achieve such a system, it is necessary to add additional hardware to the transmitting PCI-Express port to perform the necessary shifts and rotations. However this is costly, at least in terms of circuit size, due to the additional registers necessary to perform the shifts and rotations. Also, as it is required under the PCI-Express base specification to be able to extract and retransmit arbitrary numbers of packets from the output buffer (known as the "retry buffer" for this reason), the handling of the retry buffer would also require more complex hardware to enable this feature to be provided in the context of the rotated and shifted packets. As the skilled reader will appreciate, increased circuit complexity typically leads to increased silicon (or other semiconductor) area for an IC (integrated circuit) implementing the port. Both increased complexity and increased size may increase a financial cost for an IC.

Therefore, in the following example, rather than adopting a shifting and rotating system for the transmitted packets, an alternative approach to addressing transmission inefficiencies caused by insertion of DLLPs into a TLP stream will be described. The system of the present example uses a forward-looking evaluative scheme to optimize DLLP insertions with a minimal increase in hardware complexity compared to a shift/rotate type system.

Figure 6:
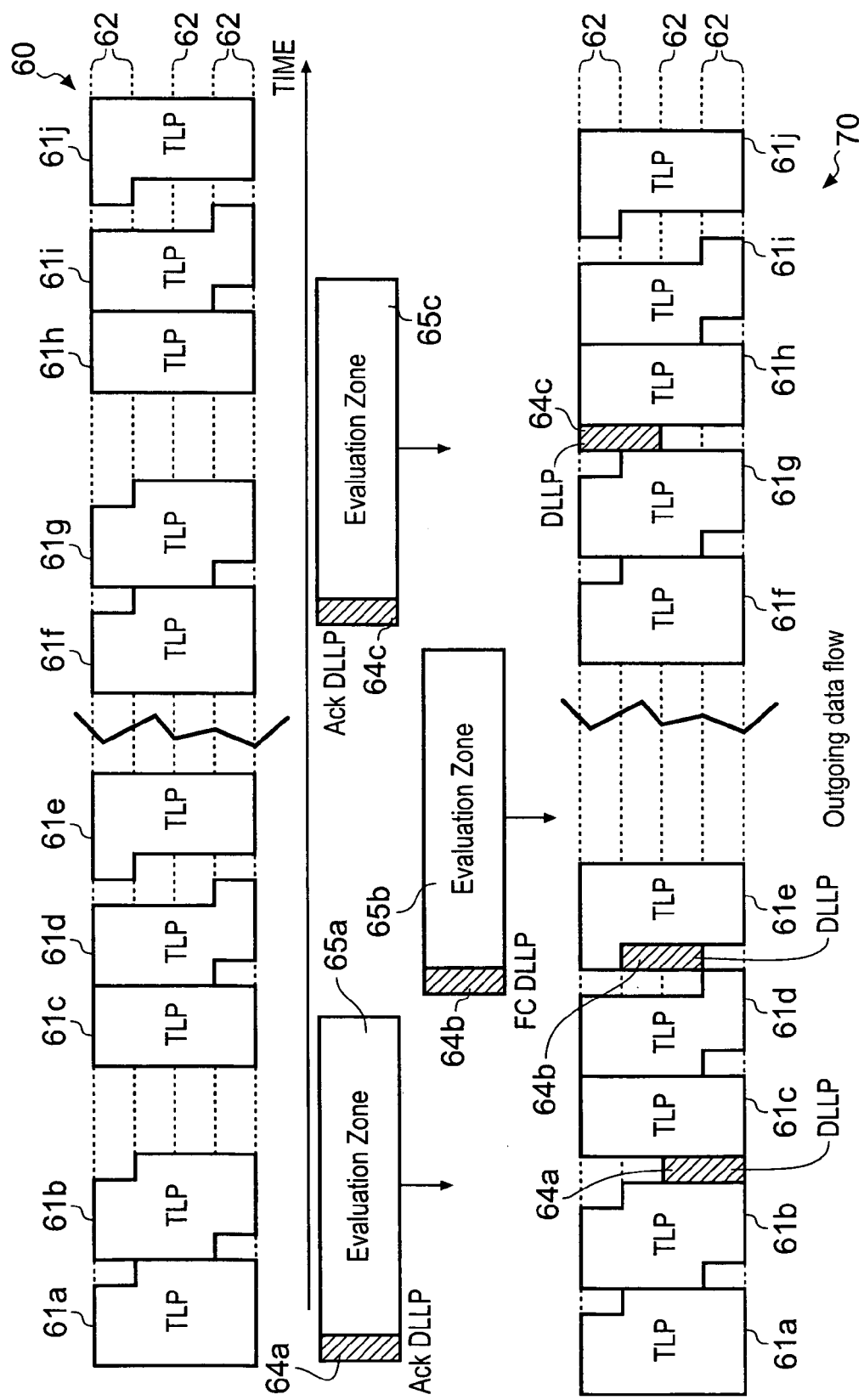
FIG. 6 shows a schematic representation of evaluative insertion of data link payer packets into the transmit sequence of FIG. 4.

There is thus shown in FIG. 6, a schematic representation of DLLP insertion according to the method of the present example.

In the example shown in FIG. 6, a TLP data stream 60 includes various TLPs 61a-j. The TLPs in the TLP stream occur such that some have large spaces therebetween, and some have no or very little space therebetween. The TLPs start and end on various ones of the 32 bit data word boundaries 62.

Into the TLP stream 60, various DLLPs 64 must be inserted. The DLLPs illustrated in the Figure are Acknowledgement DLLPs 64a and 64c and Flow Control DLLP 64b.

In the system of the present example, a DLLP insertion process establishes that a DLLP is required for either Acknowledgement or Flow Control purposes. That process then uses the conditions which require the DLLP to determine an evaluation zone 65 therefor. The evaluation zone represents a range of possible transmission times for the DLLP which will satisfy the conditions which give rise to the need for the DLLP to be transmitted. The process then analyses the upcoming TLP stream (which is stored in a retry buffer ready for transmission) to attempt to locate an existing gap between TLPs at a position in the TLP stream which corresponds to the evaluation zone for that DLLP. If such a gap is found, then the DLLP can be inserted thereinto when the TLP stream is transmitted as an outgoing data flow 70.

In the example shown in FIG. 6, Acknowledgement DLLP 64a has defined therefor an evaluation zone 65a. Thus, upon analysis of the TLP stream 60, a gap is identified, within the extent of evaluation zone 65a, between TLPs 61b and 61c. Therefore DLLP 64a can be inserted into that gap such that no additional gap need be created.

Considering Flow Control DLLP 64b, this packet has an evaluation zone 65b defined therefor. Upon analysis of the TLP stream 60, a gap is identified, within the extent of evaluation zone 65b, between TLPs 61d and 61e. Therefore DLLP 64b can be inserted into that gap such that no additional gap need be created.

Considering now Acknowledgement DLLP 64c, this packet has an evaluation zone 65c defined therefor. Upon analysis of the TLP stream 60, a gap is identified, within the extent of evaluation zone 65c, between TLPs 61g and 61h. Therefore DLLP 64b can be inserted into that gap such that no additional gap need be created.

It will be appreciated that it is statistically very unlikely that an existing gap will be found for each and every DLLP that is required to be transmitted. In such cases it will be necessary to force open a new gap as illustrated with reference to FIG. 5 above. However, for each existing gap that is found using the forward-looking evaluative process of the present example, link optimization is increased and bandwidth wastage reduced.

Thus there has now been described an example of a system for using evaluative forward-looking to determine an optimum scheduling for a data transfer link management packet. Thereby a reduction in link utilization caused by forcing open a gap between data packets can be avoided in situations where an existing gap is identified at a usable location.

Figure 7:
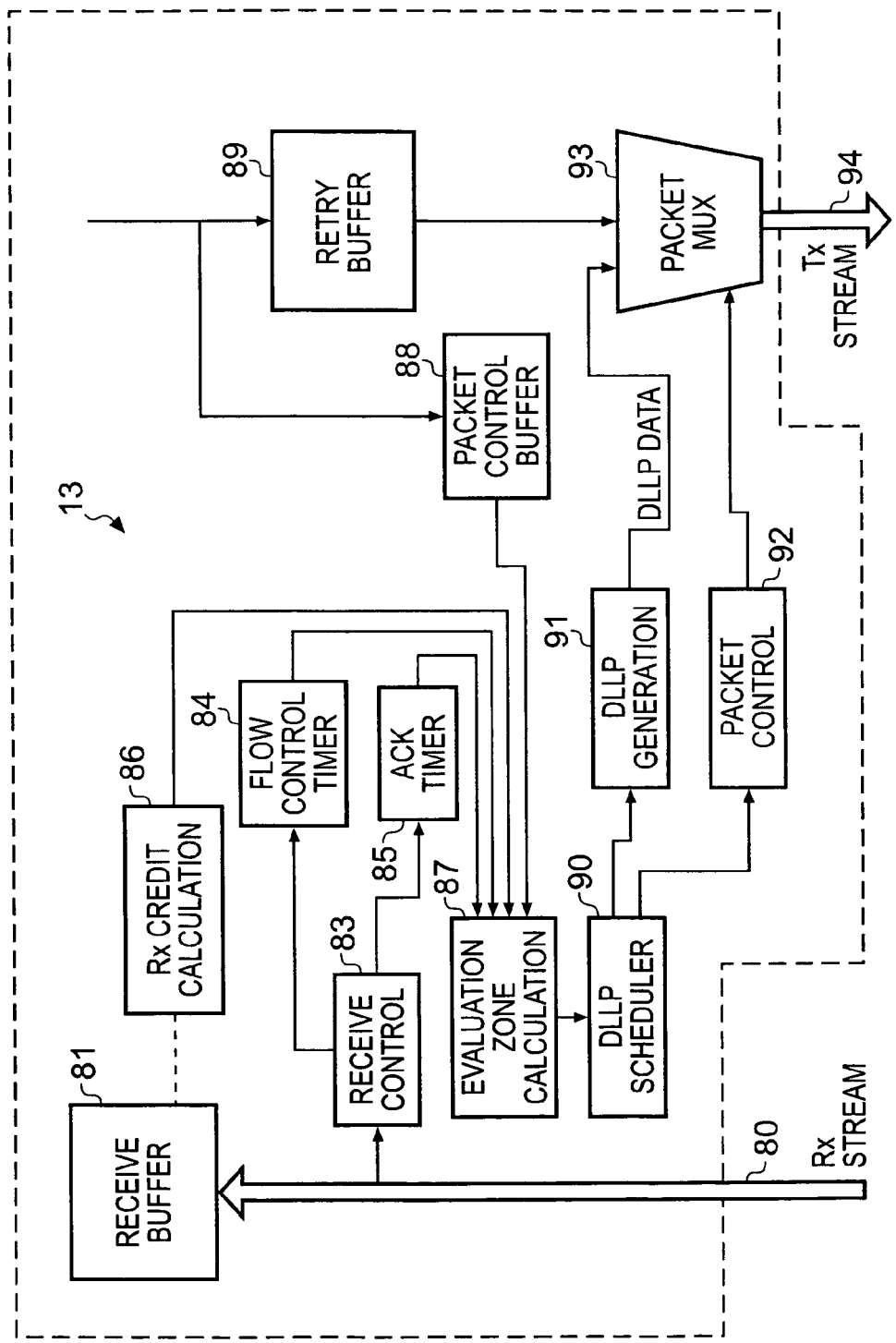
FIG. 7 shows a schematic block diagram of elements in a port operable to perform the evaluative insertion shown in FIG. 6.

With reference to FIG. 7, there will now be described an example of a PCI-Express transmit/receive port pair 13 operable to implement the process described above with reference to FIG. 6.

As can be seen from FIG. 7, the port pair 13 receives packets in a receive stream 80. These incoming packets are stored in a receive buffer 81. Header information from received data carrying packets (TLPs) is accessed from the receive stream 80 by a receive control unit 83. The receive control unit is therefore able to identify received TLPs and to instruct that acknowledgement management packets (DLLPs) be sent to acknowledge receipt of those TLPs. The receive control unit 83 provides an input to an acknowledgement timer 85. The acknowledgement timer 85 is thus provided with details of TLPs received and time of receipt information therefor. The acknowledgement timer 85 can therefore instruct that an acknowledgement DLLP be sent within a timescale that will prevent the sender of a given TLP from reaching an acknowledgement timeout and resending that TLP.

The receive control unit 83 also provides an input to the flow control timer 84 in order that information about received TLPs can be used to optimize the transmission of flow control DLLPs beyond a simple timer approach. Information which could be used by such a system includes: number of received TLPs, actual TLP sizes and receive buffer status. This information, when fed to the flow control timer can be used to implement a demand driven approach to credit announcement. Thus a faster DLLP update time and lower bandwidth wastage on DLLP transmission can be achieved relative to a simple timer-based approach.

Also present is a flow control timer 84 which counts a time interval since a Flow Control DLLP was last transmitted. The flow control timer 84 can instruct that a Flow Control DLLP be sent within a timescale that will prevent a device connected over the PCI Express link from determining from a watchdog timeout that the port pair 13 has failed and therefore commencing a link re-establishment protocol.

Connected to the receive buffer 81 is a receive credit calculation unit 86. This unit calculates an available receive buffer space for incoming packets to be queued into. In an operational circumstance where data is being removed from the receive buffer 81 as it is being received by the port pair 13, then receive credit will be available most of the time, and thus such credit can be advertised using flow control DLLPs. However, if data starts to back-up in the buffer (in a circumstance where the data is being received faster than it is being read from the receive buffer 81) then it is necessary to limit the amount of data being received at the port pair 13 until the receive buffer 81 becomes emptier; this is achieved by not releasing further credit until the buffer starts to empty. To manage this situation, a receive buffer maximum acceptable fill level threshold can be determined and, once this level is reached, no further credit is released until the fill level drops below the threshold. If flow control DLLPs are required to avoid a timeout, during a period of the fill level threshold being exceeded, the flow control DLLPs can advertise zero available credit.

The flow control timer 84, acknowledgement timer 85, and receive credit calculation unit 86 all have outputs connected to an evaluation zone calculation unit 87. The evaluation zone control unit 87 also receives an input from a packet control buffer 88 which in turn receives information about all TLPs queued for transmission from the port pair 13 as those TLPs are written into the port pair outgoing TLP retry buffer 89. On the basis of the inputs thereto, the evaluation zone calculation unit 87 can determine if a DLLP needs to be transmitted, and determine a transmission possibility window or evaluation zone for that packet.

Having established an evaluation zone for transmission of a required DLLP, the evaluation zone calculation unit 87 uses the TLP information from the packet control buffer 88 to determine whether space is available in the TLP stream within the evaluation zone into which the DLLP can be inserted. This information is then passed to a DLLP scheduler 90 for the DLLP to be scheduled for transmission. If such a gap is identified, then the DLLP is scheduled to be inserted thereinto. If no such gap is identified, then the packet is sent in accordance with the PCI-Express defined timeouts. Thus a forced new gap is created to permit the DLLP to be sent at the end of the evaluation zone.

The DLLP scheduler 90 therefore instructs a DLLP generation unit 91 to generate the required DLLP, and also instructs a packet control unit 92 with the determined scheduling information for the DLLP.

The generated DLLP from the DLLP generation unit is therefore output to a packet multiplexer 93 which also receives outgoing TLPs from the retry buffer 89. The packet multiplexer 93 includes the DLLP in the TLP stream at the scheduled time under the control of packet control unit 92. This packet stream including both TLPs and DLLPs is then transmitted over the PCI-Express link as transmit stream 94.

Thus there has now been described an example of an apparatus operable to schedule the transmission of management packets into existing gaps between data carrying packets in a stream of data packets for transmission over a point-to point serial link such as a PCI-Express link. Thereby bandwidth utilization of that link can be optimized and latency increases due to forced creation of gaps can be avoided.

Figure 8:
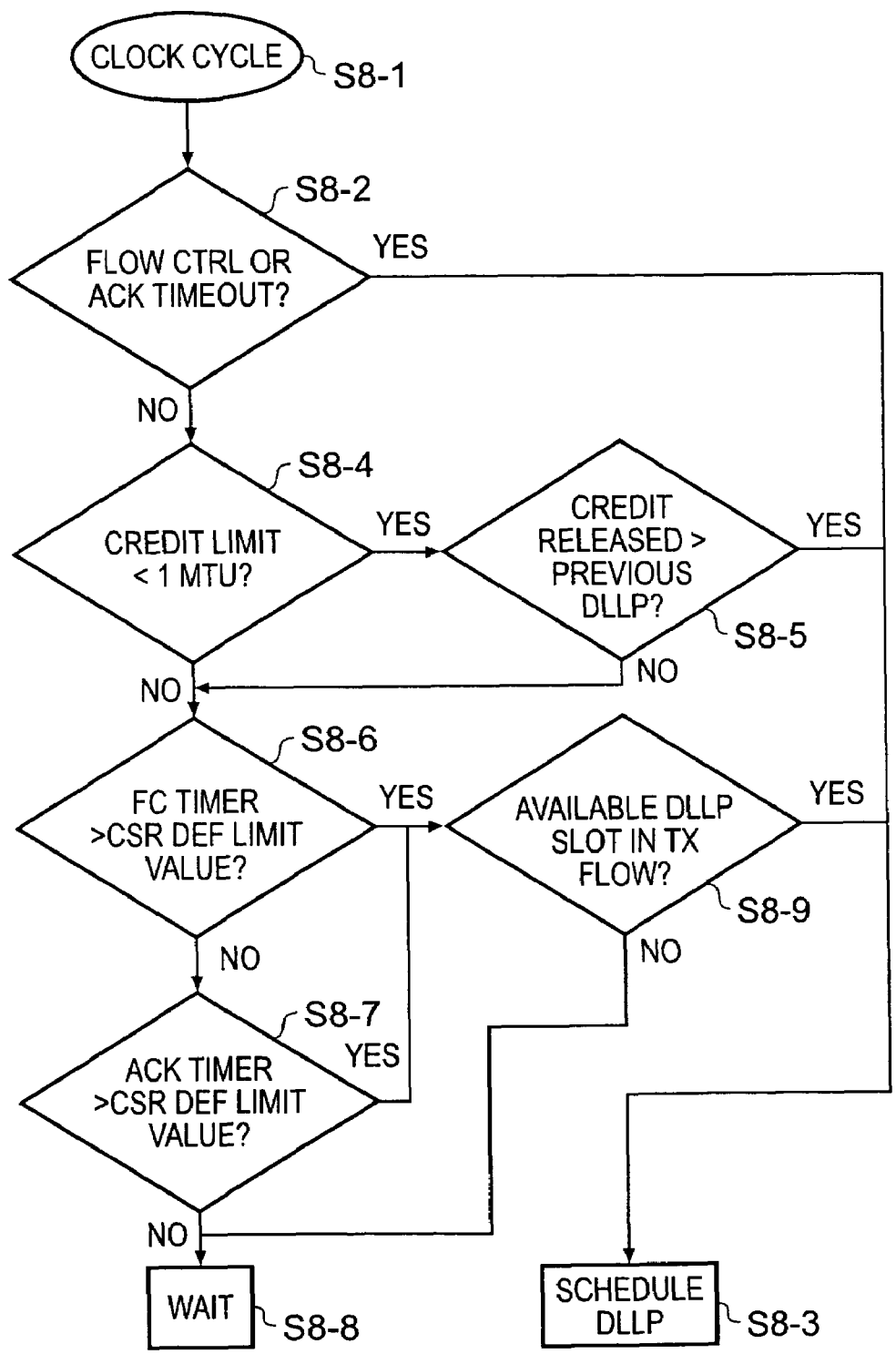
FIG. 8 shows a flow chart of steps for calculation of a data link layer packet insertion point using the evaluative insertion shown in FIG. 6.

With reference to FIG. 8, there will now be described a process for determining management packet scheduling within a system such as that described with reference to FIG. 7 above.

The process starts at step S8-1 with a system clock transition occurring (i.e. the following evaluation process is carried out on every clock cycle). Upon this clock cycle, the outputs of the flow control timer 84 and acknowledgement timer 85 are checked for a timeout by the evaluation zone calculation unit 87 at step S8-2. If such a timeout is detected, then a DLLP is required immediately and at step S8-3, a DLLP is scheduled for immediate transmission. In this circumstance, a gap may be forced between TLPs of the outgoing stream if no such gap is already present.

On the other hand, if at step S8-2, it is determined that no flow control or acknowledgement timeout has occurred, then processing continues at step S8-4 where a check is performed to determine whether the remaining previously advertised receive credit is less than one PCI-Express maximum transmission unit (MTU) which defines the maximum allowable TLP size for the system. The PCI-Express specification sets out a range of possible MTU sizes, and each PCI-Express device can be configured to handle a given one of the PCI-Express defined MTUs. A device can of course be configured to handle packets smaller than the MTU size. The amount of advertised credit is tracked by the Rx credit calculation unit 86. If the advertised receive credit has dropped below this threshold value, then a check is performed at step S8-5 to determine whether credit available to be advertised is greater than the amount of credit advertised in the previous flow control DLLP. That is to say, has more credit become available since the last time credit was advertised? If more credit has become available then the processing moves on to step S8-3 where a DLLP is scheduled for transmission.

On the other hand, if the amount of credit has not increased, then processing continues at step S8-6. Also, if it is determined at step S8-4 that the remaining previously advertised receive credit is greater than one MTU, then processing continues at step S8-6. At step S8-6, a comparison is performed to determine whether the current value of the flow control timer is greater than a predefined count threshold for the flow control timer. If not, then processing continues at step S8-7 where a similar check is performed between the current value of the acknowledgement timer and a predefined count threshold for the acknowledgement timer. If this comparison is also negative, then it is determined to be unnecessary to schedule a DLLP at the present time and the process waits for the next clock cycle at step S8-8.

On the other hand, if it is determined at step S8-6 or S8-7 that the current value of either of the Flow Control Timer or the Acknowledgement Timer is greater than the respective predetermined count value threshold, then processing continues at step S8-9 where a check is performed by the evaluation zone calculation unit 87 to determine whether a slot is available for a DLLP in the TLP stream. If so, then a DLLP is scheduled for that slot at step S8-3, and if not then the system waits for the next clock cycle at step S8-8. Thereby a DLLP can be scheduled to take advantage of a slot within an evaluation zone to be sent prior to timeout so that no forced gap is required.

In the present example, the predetermined count thresholds determine the length of the evaluation zone. The end of the evaluation zone is the time at which a counter timeout will occur, and the start of the evaluation zone is the predetermined count threshold. Thus the threshold can be set to increase or decrease the length of the evaluation zone in dependence upon desired performance properties of the system. Setting the evaluation zone to be very long may result in an unnecessarily large number of DLLPs being sent (i.e. each DLLP may be sent a long time before timer timeout, resulting in the timeout timer being restarted much sooner than necessary to prevent timeout) thereby increasing management overhead. Setting the evaluation zone to be very short may result in a lower number of DLLPs being scheduled using the evaluation zone and more being scheduled as a result of timer timeout such that more forced gaps may be needed.

Thus there has now been described an example of a method for determining when to schedule a data link management packet for optimum link usage efficiency yet still meeting requirements set down for maximum inter-packet times for management packets and ensuring that link utilization is not compromised by excessive waiting for existing gaps in a transmit stream.

For the method shown in and described with reference to FIG. 8, it is found for the example of a PCI-Express switch having links of widths between 1× and 16× that in most instances the scheduling of a DLLP will be in response to a positive determination at step S8-9. That is to say that the majority of DLLPs can be scheduled into existing gaps in the TLP stream and only rarely is it necessary to force a gap in the TLP stream by virtue of a positive result at step S8-2 or S8-5.

Figure 9:
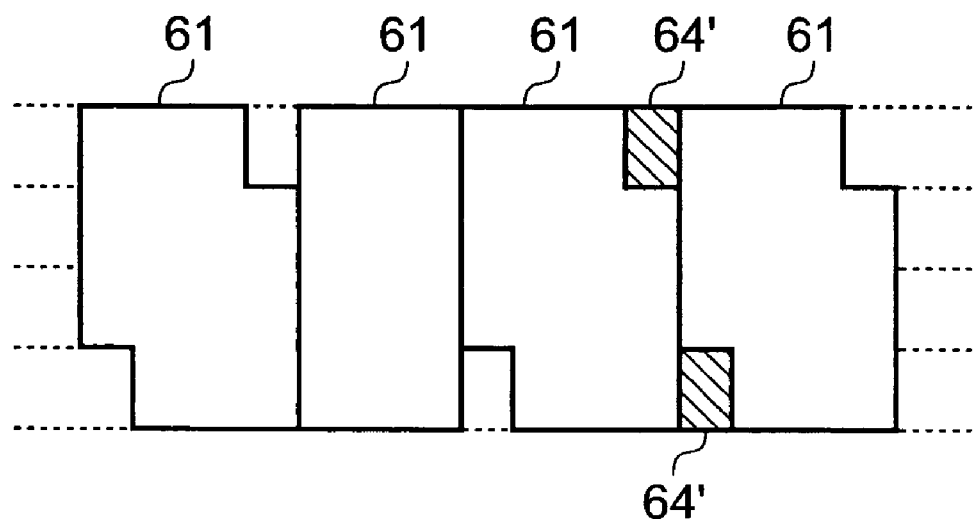
FIG. 9 shows a schematic representation of a data link layer packet rotated across a cycle boundary.

Although it has been described above that shifting and rotating of TLPs in the transmit stream implies a significant negative impact in terms of circuit complexity and silicon area usage, it is possible to use a rotation scheme for the DLLPs, as this requires much less circuit complexity than shifting and rotating of DLLPs. Such a scheme would therefore allow a DLLP to be transmitted over two cycles, with the first half in one cycle and the second half in the next cycle. This can increase the link utilization for DLLP transmission since TLPs are always multiples of 32 bits in size and DLLPs are always 64 bits in size. To illustrate how such a scheme might be employed, FIG. 9 shows a DLLP 64' arranged across a cycle boundary between two TLPs 61. Thus, if no 64 bit gaps occur within any single cycle of an evaluation zone, but consecutive 32 bit gaps occur over two consecutive cycles, a DLLP can be inserted without forcing a new gap between TLPs.

As will be appreciated, an integrated circuit design embodying the features of the above example could be created using any integrated circuit design method. For example, a circuit design could be produced using a suitable programming language such as VHDL, Verilog, SystemC, Handel-C (or other HDL extension to C/C++), JHDL (Just another (Java) Hardware Definition Language) (or other HDL extension to Java), or Pebble. Such a design can then be used to manufacture integrated circuits embodying features of the above examples.

Some embodiments of the present invention include a computer readable medium storing instructions that, when executed by a computer, cause the computer to perform a method for controlling insertion of link management packets into a data packet stream for a PCI Express port. Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

What is claimed is:

1. A port operable for a PCI Express link, comprising:
   a scheduler operable to determine a next management packet transmission time;
   a windower operable to determine a transmission window based upon the next management packet transmission time;
   an evaluative forward-looker to determine an optimum scheduling for a data transfer link management packet based on the number of received TLPs, actual TLP sizes, and receive buffer status,
   wherein the evaluate forward-looker analyzes an upcoming TLP stream to locate an existing gap between TLPs at a position in the TLP stream which corresponds to a range of possible transmission times for the data transfer link management packet; and
   an inserter operable to examine a data packet stream to determine whether a gap therein occurs during the transmission window, and if such said gap does occur to control insertion of a management packet thereinto.

2. The port of claim 1, wherein the scheduler is operable to determine a transmission time on the basis of at least one of: a flow control timer, a receive acknowledge timer, and an available transmission credit monitor.

3. The port of claim 1, wherein the windower is operable to determine the window on the basis of at least one of: a desired link responsiveness, a management packet transmission urgency and received data packet size.

4. The port of claim 1, wherein the inserter comprises a packet generator operable to generate a management packet for insertion into the data packet stream.

5. The port of claim 1, operable for multiple lane links.

6. The port of claim 1, wherein the inserter is operable if no such gap does occur to control creation of a gap between two data packets and insertion of the management packet thereinto.

7. The port of claim 1, wherein the inserter is operable if no such gap does occur to not send a management packet.

8. The port of claim 1, wherein the inserter is operable to identify a gap split between consecutive cycles and to rotate a management packet to fit into such a split gap.

9. An integrated circuit design for use in creation of an integrated circuit operable as the port of claim 1.

10. The integrated circuit design of claim 9, expressed using a hardware definition language.

11. The port of claim 1, wherein the port is implemented as an integrated circuit.

12. A port operable for a PCI Express link, comprising:
   scheduler means for determining a next management packet transmission time;
   windower means for determining a transmission window based upon the next management packet transmission time;
   an evaluative forward-looking means to determine an optimum scheduling for a data transfer link management packet based on the number of received TLPs, actual TLP sizes, and receive buffer status,
   wherein the evaluative forward-looking means analyzes an upcoming TLP stream to locate an existing gap between TLPs at a position in the TLP stream which corresponds to a range of possible transmission times for the data transfer link management packet; and
   inserter means for examining a data packet stream to determine whether a gap therein occurs during the transmission window, and
   if such said gap does occur for controlling insertion of a management packet thereinto.

13. A method for controlling insertion of link management packets into a data packet stream for a PCI Express port, the method comprising:
   determining a next management packet transmission time;
   determining a transmission window based upon the determined next management packet transmission time;
   examining a data packet stream for gaps therein during the determined transmission window;
   using evaluative forward-looking to determine an optimum scheduling for a data transfer link management packet based on the number of received TLPs, actual TLP sizes, and receive buffer status, wherein using evaluative forward-looking comprises analyzing an upcoming TLP stream to locate an existing gap between TLPs at a position in the TLP stream which corresponds to a range of possible transmission times for the data transfer link management packet; and inserting a management packet into such a gap, if said gap is identified.

14. The method of claim 13, wherein the determining a transmission time is performed on the basis of at least one of a flow control timer, a receive acknowledge timer, and an available transmission credit monitor.

15. The method of claim 13, wherein the determining a transmission window is performed on the basis of at least one of a desired link responsiveness, a management packet transmission urgency and received data packet size.

16. The method of claim 13, wherein inserting comprises generating a management packet for insertion into the data packet stream.

17. The method of claim 13, for multiple lane links.

18. The method of claim 13, wherein the inserting comprises creation of a gap between two data packets if no such gap is identified and inserting of the management packet thereinto.

19. The method of claim 13, wherein the insertion is not performed if no such gap is identified.

20. The method of claim 13, wherein the examining comprises identifying a gap split between consecutive cycles, and wherein the inserting comprises rotating a management packet to fit into such a split gap.

21. An integrated circuit design for use in creation of an integrated circuit operable to carry out the method of claim 13.

22. The integrated circuit design of claim 21, expressed using a hardware definition language.

23. A computer readable medium storing instructions that, when executed by a computer, cause the computer to perform a method for controlling insertion of link management packets into a data packet stream for a PCI Express port, the method comprising:

determining a next management packet transmission time;

determining a transmission window based upon the determined next management packet transmission time;

examining a data packet stream for gaps therein during the determined transmission window;

using evaluative forward-looking to determine an optimum scheduling for a data transfer link management packet based on the number of received TLPs, actual TLP sizes, and receive buffer status, wherein using evaluative forward-looking comprises analyzing an upcoming TLP stream to locate an existing gap between TLPs at a position in the TLP stream which corresponds to a range of possible transmission times for the data transfer link management packet; and inserting a management packet into such a gap, if said gap is identified.

24. An integrated circuit for controlling insertion of link management packets into a data packet stream for a PCI Express port, the integrated circuit comprising:

scheduling circuitry for determining a next management packet transmission time;

window circuitry for determining a transmission window based upon the determined next management packet transmission time;

examination circuitry for examining a data packet stream to identify a gap therein during the determined transmission window;

evaluative forward-looking circuitry for determining an optimum scheduling for a data transfer link management packet based on the number of received TLPs, actual TLP sizes, and receive buffer status, wherein the evaluate forward-looking circuitry analyzes an upcoming TLP stream to locate an existing gap between TLPs at a position in the TLP stream which corresponds to a range of possible transmission times for the data transfer link management packet; and insertion circuitry for inserting a management packet into such said gap, if said gap is identified.

* * * * *

UNITED STATES PATENT AND TRADEMARK OFFICE
CERTIFICATE OF CORRECTION

PATENT NO. : 7,583,600 B1  Page 1 of 1
APPLICATION NO. : 11/221535
DATED : September 1, 2009
INVENTOR(S) : Schanke et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 788 days.

Signed and Sealed this

Fourteenth Day of September, 2010

David J. Kappos
*Director of the United States Patent and Trademark Office*